United States Patent [19]

Ando et al.

[11] Patent Number: 5,233,691
[45] Date of Patent: Aug. 3, 1993

[54] REGISTER WINDOW SYSTEM FOR REDUCING THE NEED FOR OVERFLOW-WRITE BY PREWRITING REGISTERS TO MEMORY DURING TIMES WITHOUT BUS CONTENTION

[75] Inventors: Hideki Ando; Hirohisa Machida, both of Itami, Japan

[73] Assignee: Mitsubishi Denki Kabushiki Kaisha, Tokyo, Japan

[21] Appl. No.: 450,633

[22] Filed: Dec. 13, 1989

[30] Foreign Application Priority Data

Jan. 13, 1989 [JP] Japan .................... 1-6812

[51] Int. Cl.⁵ .............................. G06F 13/00
[52] U.S. Cl. .................... 395/250; 395/375; 395/800; 395/425; 395/275; 364/238.8; 364/280.8
[58] Field of Search ... 364/200 MS File, 900 MS File; 395/800, 425, 250, 275, 375

[56] References Cited

U.S. PATENT DOCUMENTS

| | | | |
|---|---|---|---|
| 4,947,366 | 8/1990 | Johnson | 364/200 |
| 4,969,091 | 11/1990 | Muller | 364/200 |
| 4,992,934 | 2/1991 | Partanova et al. | 364/200 |
| 5,083,263 | 1/1992 | Joy et al. | 395/425 |
| 5,107,457 | 4/1992 | Hayes et al. | 395/800 |
| 5,159,680 | 10/1992 | Joy et al. | 395/425 |

OTHER PUBLICATIONS

"A VLSI RISC" Patterson et al, Computer, vol. 15, No. 9, pp. 8-18, 20 Sep. 1982.

*Primary Examiner*—Robert B. Harrell
*Assistant Examiner*—William M. Treat
*Attorney, Agent, or Firm*—Townsend and Townsend Khourie and Crew

[57] ABSTRACT

A reduced instruction set computer which adopts a configuration of controlling in a manner that in response to an access to a register file, the using state of an external bus or the like, if possible, in a period before an overflow of the register file takes place, register windows used in the procedure called in the past are made to save in advance into a stack of a memory, as a result, there is a high possibility that processing of making the register windows save into the stack of the memory has been already completed even if an overflow takes place in the register file, whereby being capable of dispensing with saving processing of the register window into the stack at this point.

1 Claim, 11 Drawing Sheets

| BLOCK | INPUT SIGNAL | OUTPUT SIGNAL | MEANING |
|---|---|---|---|
| DECODER | INSTRUCTION CODE | call | : CALL INSTRUCTION |
| | | return | : RETURN INSTRUCTION |
| | | acc_mem | : MEMORY ACCESS INSTRUCTION |
| | | call_trap_end | : END OF CALL TRAP PROCESSING |
| | | return_trap_end | : END OF RETURN TRAP PROCESSING |
| STATUS REGISTER | set_s0 | s0 | : STATUS BIT 0 |
| | set_s1 | s1 | : STATUS BIT 1 |
| | set_s0 | s2 | : STATUS BIT 2 |
| | reset_s0 | | |
| | reset_s1 | | |
| | reset_s0 | | |
| DECODER | s0 | set_s0 | : SET OF STATUS BIT 0 |
| | s1 | set_s0 | : SET OF STATUS BIT 0 |
| | s2 | set_s0 | : SET OF STATUS BIT 0 |
| | call | reset_s0 | : RESET OF STATUS BIT 0 |
| | return | reset_s1 | : RESET OF STATUS BIT 0 |
| | use_mem | reset_s2 | : RESET OF STATUS BIT 2 |
| | cw>stw | cw++ | : UP OF COUNTER cw |
| | cw<stw | cw-- | : DOWN OF COUNTER cw |
| | cw==rfb | stw++ | : UP OF COUNTER stw |
| | stw==rfb | stw-- | : DOWN OF COUNTER stw |
| | wc==WINDOW_SIZE | rfb++ | : DOWN OF COUNTER rfb |
| | rf_underflow | swt++ | : UP OF COUNTER swt |
| | call_trap | swt-- | : DOWN OF COUNTER swt |
| | return_trap | rsw++ | : DOWN OF COUNTER STW |
| | | st++ | : UP OF COUNTER st |
| | | st | : LOAD CONTENT OF COUNTER swt TO COUNTER st |
| | | wc++ | : UP OF COUNTER wc |
| | | wc=0 | : RESET OF COUNTER wc |
| | | rf_underflow | : UNDERFLOW OF REGISTER FILE |
| | | call_trap_start | : START OF CALL TRAP PROCESSING |
| | | return_trap_start | : START OF RETURN TRAP PROCESSING |

Fig. 5(b)

```
COUNTER
cw       cw++              cw       : OUTPUT OF COUNTER cw
         cw--              stw      : OUTPUT OF COUNTER stw
stw      stw++             rfb      : OUTPUT OF COUNTER rfb
rfb      rfb++             swt      : OUTPUT OF COUNTER swt
swt      swt++             rsw      : OUTPUT OF COUNTER rsw
         swt--             st       : OUTPUT OF COUNTER st
rsw      rsw++             wc       : OUTPUT OF COUNTER wc
st       st++
         st=swt
wc       wc++
         wc=0

COMPARATOR cw              cw==stw         : COUNTER cw AND stw ARE EQUAL
           stw             cw > stw        : COUNTER cw IS LARGER THAN stw
           rfb             cw < stw        : COUNTER cw IS SMALLER THAN stw
           swt             cw==rfb         : COUNTER cw AND rfb ARE EQUAL
           rsw             stw > rfb       : COUNTER stw IS LARGER THAN rfb
           st              stw==rfb        : COUNTER stw AND rfb ARE EQUAL
           wc              wc=WINDOW_SIZE  : COUNTER wc IS EQUAL TO CONSTANT
                                             WINDOW_SIZE FLIP-FLOP GROUP
S/R_0    call_trap_start   call_trap   : DURING CALL TRAP PROCESSING
         call_trap_end
S/R_1    return_trap_start return_trap : DURING RETURN CALL TRAP PROCESSING
         return_trap_end
```

Fig. 6

| STATUS | CONDITION | OUTPUT | NEXT STATUS |
|---|---|---|---|
| INITIAL (s2,s1,s0)=(000) | !call !return cwl=swt wcl=WINDOW_SIZE !use_mem | cw++ st++ | INITIAL |
| | !call !return cwl=swt wcl=WINDOW_SIZE | stw++ swt-- wc=0 | INITIAL |
| | call | cw++ set_s0 | CALL TRAP JUDGMENT |
| | return cw==rfb | cw-- rf_underflow set_s1 | RETURN TRAP JUDGMENT |
| | return cwl=rfb | cw-- set_s1 | RETURN TRAP JUDGMENT |
| CALL TRAP JUDGMENT (s2,s1,s0)=(001) | cwl=rfb | reset_s0 | INITIAL |
| | cw==rfb stw==rfb | rsw++ rfb++ reset_s0 | INITIAL |
| | cw==rfb stw==rfb | call_trap_start set_s1 | CALL TRAP |
| RETURN TRAP JUDGMENT (s2,s1,s0)=(010) | !rf_underflow cw>stw | reset_s1 | INITIAL |
| | !rf_underflow cw=stw | wc=0 | INITIAL |
| | !rf_underflow cw<stw | swt-- stw-- st=swt reset_s1 | INITIAL |
| | rf_underflow | return_trap_start reset_s1 set_s2 | RETURN TRAP |
| CALL TRAP (s2,s1,s0)=(011) | !call_trap | reset_s0 reset_s1 | INITIAL |
| RETURN TRAP (s2,s1,s0)=(100) | !return_trap | reset_s1 | INITIAL |

```
set_s0              = !s0  !s1  !s2  call
set_s1              = !s0   s1  !s2  return + s0 !s1 !s2 cw==rfb  stw==rfb
set_s2              = !s0  !s1   s2  rf_underflow
reset_s0            =  s0  !s1  !s2  (cw!=rfb + cw==rfb stw!=rfb)
                    + s0   s1  !s2  !call_trap
reset_s1            = !s0   s1  !s2  + s0 !s1 !s2 !call_trap
reset_s2            = !s0   s1   s2  !return_trap
push_word           = !s0  !s1  !s2  call
cw++                = !s0  !s1  !s2  call
cw--                = !s0  !s1  !s2  return
stw++               = !s0  !s1  !s2  !call !return  wc=WINDOW_SIZE
stw--               =  s0  !s1  !s2  !rf_underflow  cw<stw
rfb++               = !s0  !s1  !s2  cw==rfb  stw!=rfb
swt++               =  s0  !s1  !s2  !call !return  wc=WINDOW_SIZE
swt--               = !s0  !s1  !s2  !rf_underflow  cw<stw
rsw++               =  s0  !s1  !s2  cw==rfb  stw!=rfb
st++                = !s0  !s1  !s2  !call !return  cw!=stw  wc!=WINDOW_SIZE    !use_mem
st=swt              = !s0  !s1  !s2  !rf_underflow  (cw==stw + cw<stw)
wc++                = !s0  !s1  !s2  !call !return  cw!=stw  wc!=WINDOW_SIZE    !use_mem
wc=0                = !s0  !s1  !s2  !call !return  wc=WINDOW_SIZE
                    + !s0  s1   !s2  !rf_underflow  cw==rfb
rf_underflow        = !s0  !s1  !s2  return  cw==rfb
call_trap_start     =  s0  !s1  !s2  cw==rfb
return_trap_start   = !s0   s1  !s2  !rf_underflow
```

NOTE: 'AND' (LOGICAL PRODUCT) SYMBOL IS OMITTED.
  '+' REPRESENTS 'OR' (LOGICAL SUM) SYMBOL.
  '!' REPRESENTS 'NOT' SYMBOL.

REGISTER WINDOW SYSTEM FOR REDUCING THE NEED FOR OVERFLOW-WRITE BY PREWRITING REGISTERS TO MEMORY DURING TIMES WITHOUT BUS CONTENTION

BACKGROUND OF THE INVENTION

1. Field of the Invention

The present invention relates to a computer, and to be further detailed, relates to a computer having a reduced instruction set, known as RISC (Reduced Instruction Set Computer).

2. Description of Related Art

The RISC is a computer which is intended to perform processing at higher speed by forming only frequently-used instructions in an instruction set of the conventional computer into hardware structures. According to D. A. Patterson and C. H. Sequin, "A VLSI RISC", Computer, vol. 15, No.9, September 1982, pp8~22, the following features are enumerated.

(1) One-cycle instruction
(2) Fixed-length instruction format
(3) Load/store architecture
(4) Wired logic
(5) Overlap register window
(6) Optimization of pipeline by means of compiler The present invention relates to the overlap register window among the above-described various features of the RISC. Hereinafter, description is made on the overlap register window in the conventional RISC in reference to the drawings.

Figure 1A:
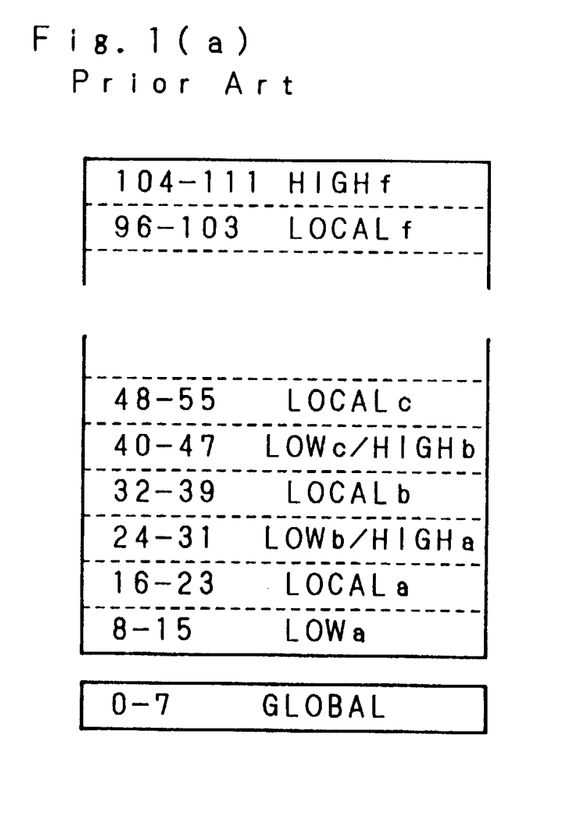
FIGS. 1(a) and (b) are schematic diagrams illustrating an overlap register window.

FIG. 1(a) is a schematic diagram showing a physical register file of the RISC.

In FIG. 1(a), addresses 0~7 are for a global register, and addresses 8~111 are for a local register. In addition, the global register means is a register for global variables, and the local register means is a register for local variables.

Figure 1B:
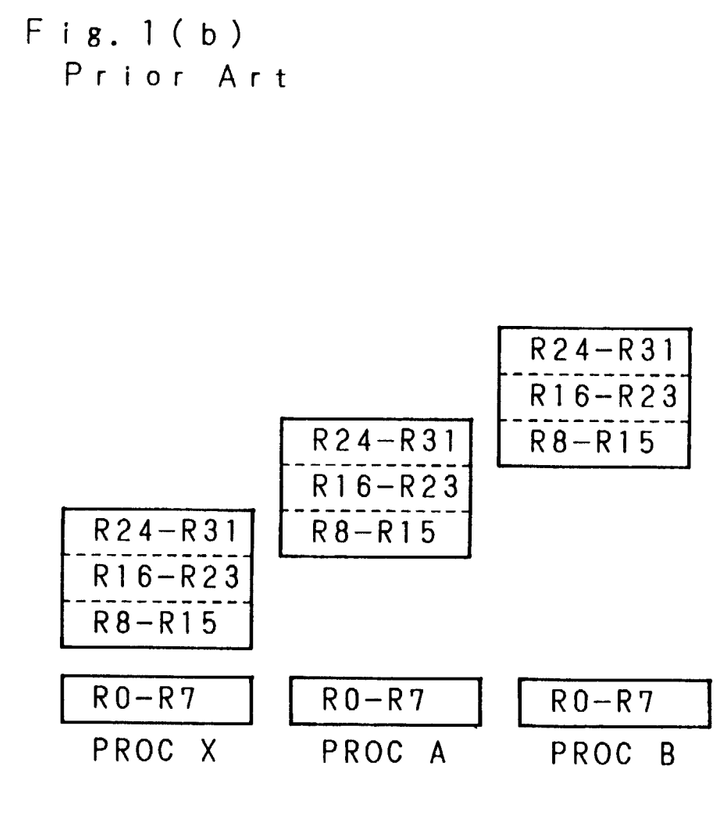

FIG. 1(b) shows a logical register file. In executing a procedure, a computer uses only part of a register called a register window in the physical register file.

For example, a procedure (PROC) A is assumed to be executed, and then this procedure A is assumed to use the addresses 0~7 of the register file as the global register, and addresses 24~47 of the same register file as the local register, respectively.

And when the procedure A calls another procedure (PROC) B further in this state, this procedure B is called by entering arguments into addresses 40~47 of the register file. Then, the called procedure B uses the addresses 0~7 of the register file as the global register, and the addresses 40~63 of the same register file as the local register, respectively.

In the conventional normal computer, when a procedure call takes place, the called environment is made to save into a stack set in a memory. However, in the RISC, there is performed no saving into the stack but such processing as moving the register window. In addition, this register window is being overlapped, and the overlapped portion is used for an argument register for transfer between procedures.

In the above-described example, the addresses 40~47 of the register file are used for both procedures A and B, and a call side prepares the argument in the addresses thereof. Like processing is performed in returning from a procedure, and the register window is moved toward lower-numbered addresses. Then, the argument at a return is prepared in the overlapped portion of the lower-numbered addresses of the register window. For such an overlapped register window as described above, saving processing of arguments into the memory can be dispensed with. Generally, the operating speed of the memory is lower in comparison with that of a CPU, and therefore in the conventional computer, the saving processing of arguments is likely to cause an overhead, however the RISC is not liable to have such an overhead.

In the example as shown in FIGS. 1(a) and (b), there are six register windows, and therefore such processing as making the environment at a call save into the memory, as is the case with the conventional computer, can be dispensed with up to five procedure calls. However, when a sixth procedure call or a call thereafter takes place, there being no room in the register file, some saving processing is required to be performed. Also in the RISC, when the residual capacity of the register file becomes zero (hereinafter referred to as overflow of register file), processing of making the oldest register window save into the memory, that is, trap routine is started. Accordingly, in the RISC, when an overflow of the register takes place, only the performance equivalent to that of the conventional general computer can be obtained.

Generally, since the RISC is fabricated as a VLSI, reduction in chip size contributes to reduction in manufacturing cost, however, it is necessary to dispose as many registers as possible on the chip to avoid an overflow of the register file. In other words, the request for reducing the cost and the request for improving the performance are in an incompatible relation with each other.

SUMMARY OF THE INVENTION

The present invention has been directed to solve such a disadvantage as described above, and proposes to provide a RISC which can avoid itself having poorer performance even if the number of register windows capable of being set is small.

The reduced instruction computer (RISC) of the present invention adopts a configuration of controlling in a manner that in response to an access to the register file, the using state of an external bus or the like, the register window(s) used by the procedure called in the past is made to save in advance into a memory, if possible, before an overflow of a register file will take place.

The RISC of the present invention has a high possibility that the processing of making the register window save into a stack of the memory has already completed even when an overflow takes place in the register file, which results in that the processing of making the register window save into the stack is not required at that point.

The above and further objects and features of the invention will more fully be apparent from the following detailed description with accompanying drawings.

DESCRIPTION OF THE PREFERRED EMBODIMENT

Hereinafter, detailed description is made on the present invention based on the drawings showing embodiments thereof.

Figure 2:
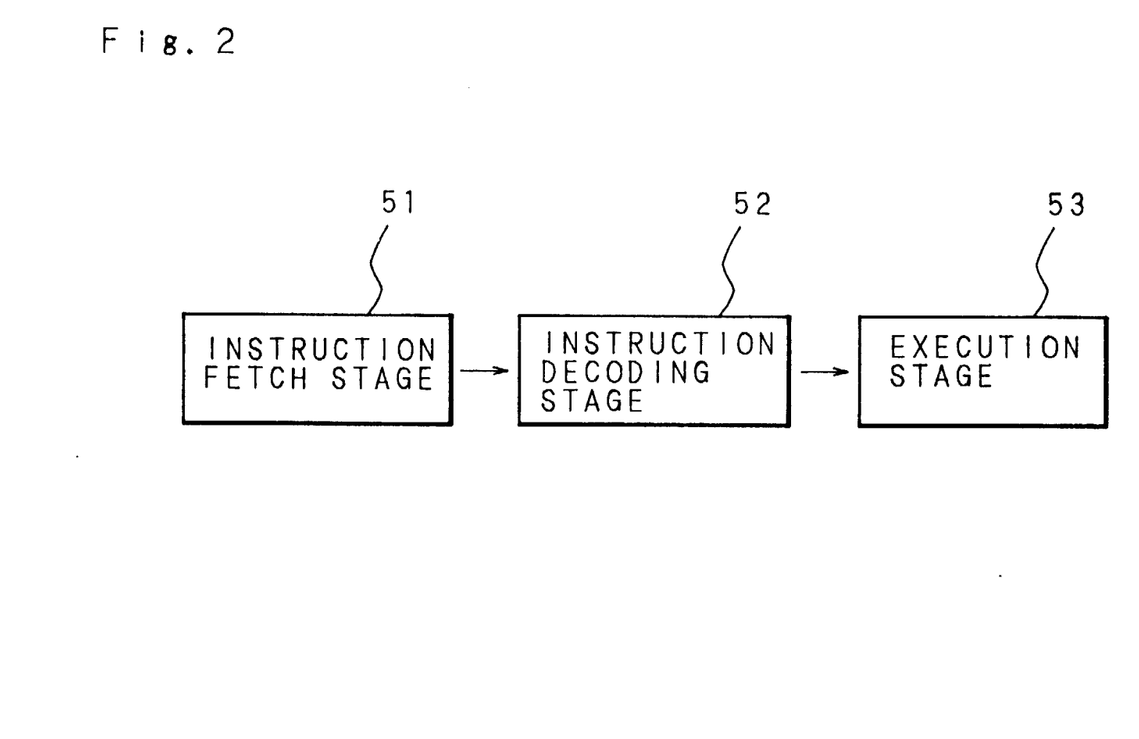
FIG. 2 is a block diagram showing a general pipelined processing mechanism of a computer.

FIG. 2 is a block diagram showing a configuration of a general pipelined processing mechanism of a computer.

This mechanism is configurated with an instruction fetch stage 51 as a first stage fetching an instruction from a memory (not illustrated), an instruction decoding stage 52 as a second stage decoding the instruction, and an execution stage 53 as a third stage performing ALU operation, loading and storing of data, or calculation of a branch target.

Figure 3:
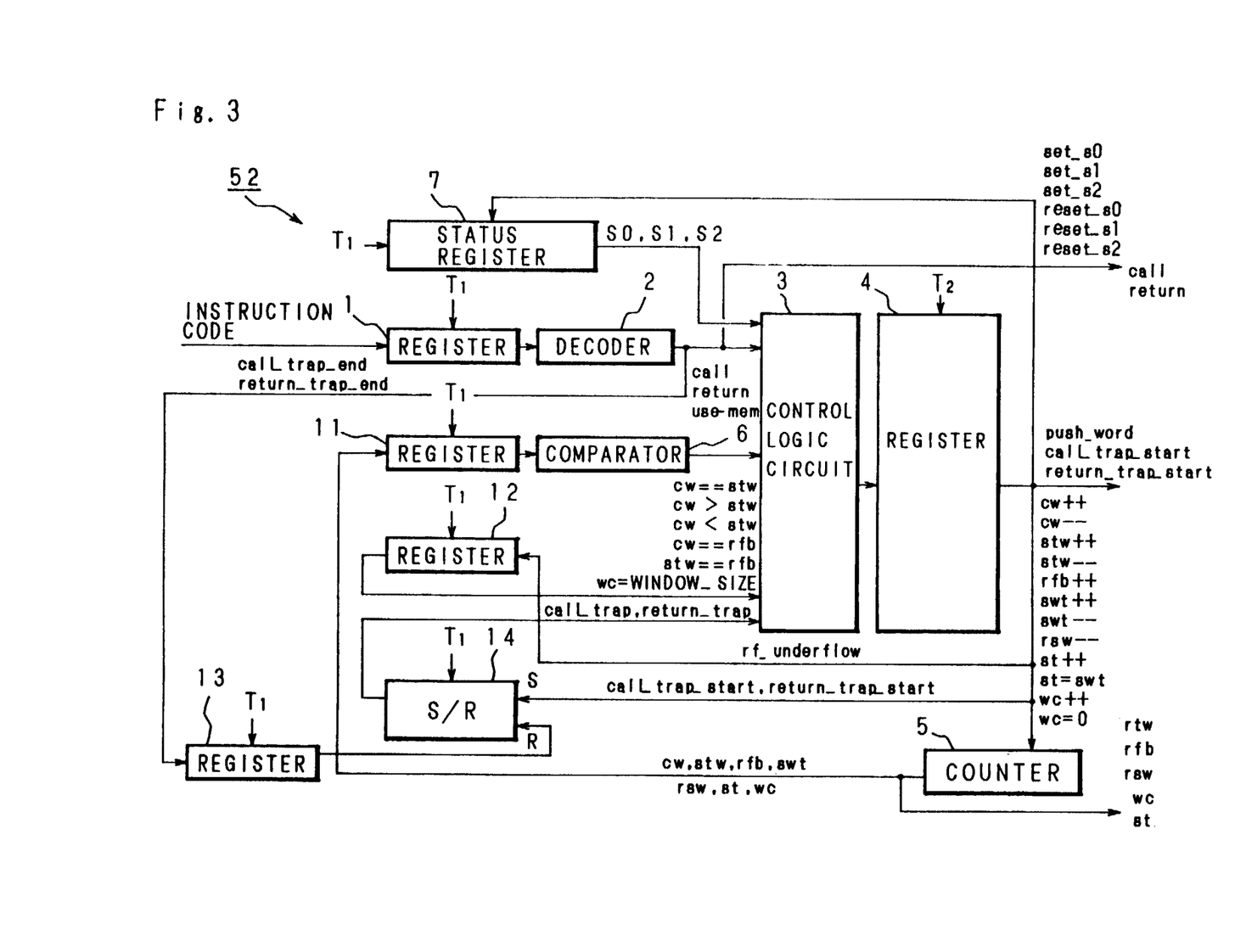
FIG. 3 is a block diagram showing a detailed configuration of an instruction decoding stage of the reduced instruction computer in accordance with the present invention.

FIG. 3 is a block diagram showing a configuration of a portion relating to the present invention in the above-described instruction decoding stage 52.

The instruction decoding stage 52 is operated by non-overlap two-phase clocks $T_1$ and $T_2$. First, an instruction is latched in a register 1 from the instruction fetch stage 51, being decoded by a decoder 2, and a control signal is generated.

The control signal generated by the decoder 2 is given to a control logic circuit 3, and a control signal for storing a register window is generated. Those control signals are latched in a register 4. In addition, most of control signals are inputted from the register 4 to a counter 5 so that it being operated and then inputted from a comparator 6 open to the control logic circuit 3 through a register 11.

The other control signals are inputted to the control logic circuit 3 through an S-R flip-flop 14 storing the trapped status or a register 12.

The counter 5 holds various pointers required for control of storing the register windows in the shack in the memory, and the meanings of the pointers held by each counter are as follows:

"cw (Current Window: a first counter value)"

Holding the base address of the register window used in a procedure under execution. Up/down of the counter is nerformed so as to point the base address of the following/preceding window.

"stw (Stored Window: a second counter value)"

Holding the base address of the register window following the register window having completed saving into the stack. Up/down of the counter is performed so as to point the base address of the following/preceding window.

"rfb (Register File Bottom: a third counter value)"

Holding the logical bottom address of a register file. Since the register file is used cyclically, a word pointed with this counter rfb is positioned at the head of the register file. Up/down of the counter is performed so as to point the base address of the following/preceding window.

"swt (Stacked Window Top: a fourth counter value)"

The register windows are made to save into the stack in the memory, but it holds the following address of a top register window among the register windows stored in the stack. Up/down of the counter is performed in a unit of window size.

"rsw (Restore Window Top: a fifth counter value)"

When an underflow of the register file takes place, it is required to restore the register window from the stack, and at that time it holds the following address of the window in the stack to be restored. Up/down of the counter is performed in a unit of window size.

"st (Stack Top: a sixth counter value)"

Holding the address of the stack top.

"wc (Word Counter: a seventh counter value)"

Counting the number of words when the register window is made to save into the stack.

Figure 4:
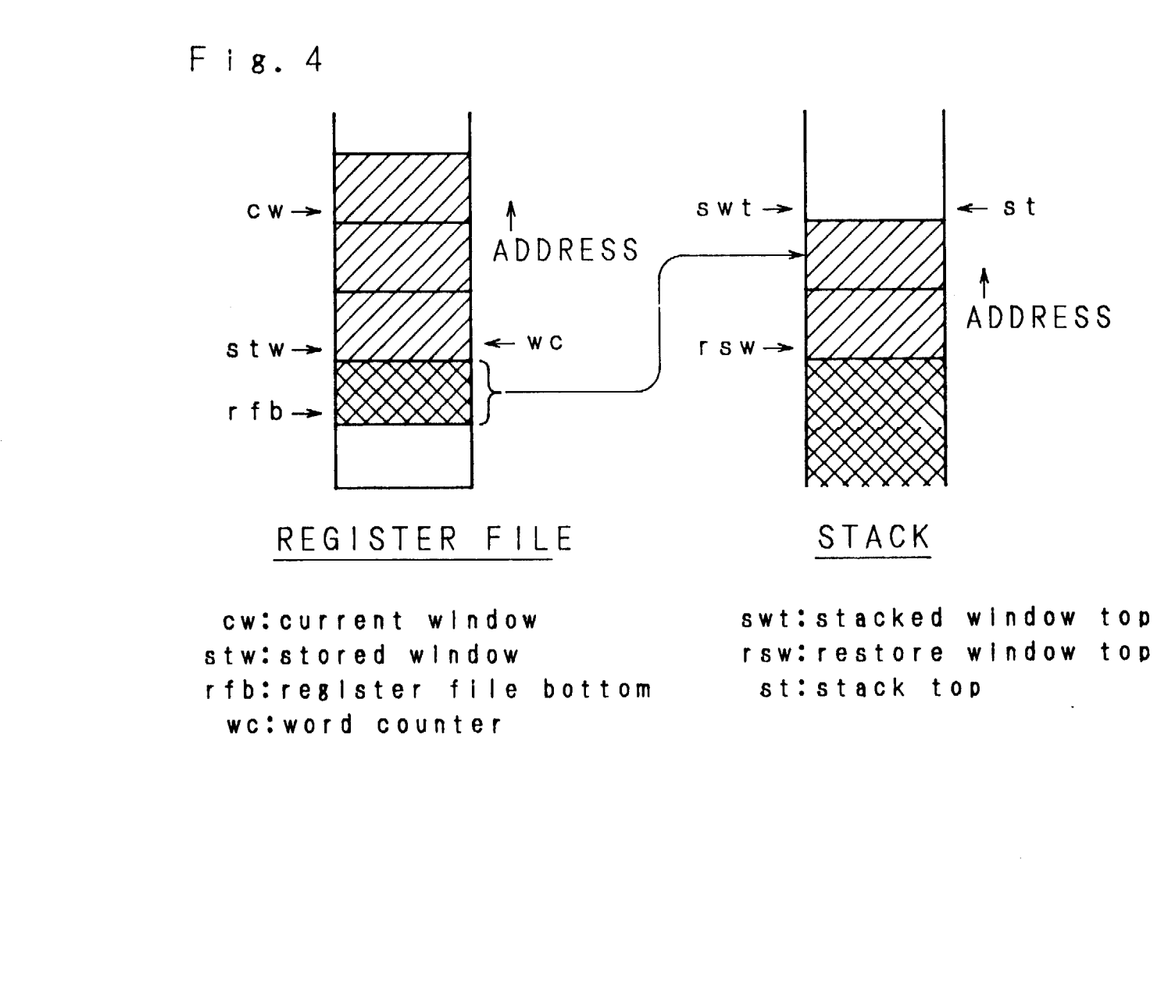
FIG. 4 is a schematic diagram showing a relationship among each pointer, each register window, and a stack of the reduced instruction computer of the present invention, FIGS. 5 (a) and (b) are tables showing the statuses of input/output signals of each block.

FIG. 4 shows an outline of relationships among the pointer of each counter, the register file and the stack.

The comparator 6 compares such each counter value as described above, and outputs the result of the comparison to the control logic circuit 3.

The decoder 2 decodes the instruction inputted from the instruction fetch stage 51, and generates a control signal. Then, instructions relating to the present invention are as follows:

call: indicating that an instruction is a procedure call.

return: indicating that an instruction is a return from the procedure.

use_mem: indicating that an instruction performs memory access. In the RISC, indicating that basically an instruction is to load or store.

call_trap_end: indicating that trap processing of call has been completed.

return_trap_end: indicating that trap processing of return has been completed.

A status register 7 is a register for holding the status of register window store control, and stores 5 statuses by three bits of status. Set/reset of the status register 7 is performed by set_si and reset_si (where i=0,1,2) which are outputs of the control logic circuit 3. In addition, the five statuses held by the status register 7 are called as will be described below, and description will be made on control executed in each status.

"Initial Status (a first status: status bits=000)"

When an instruction is procedure call or procedure return, the status is changed accordingly. When an instruction is neither of the both, judgment is made on whether or not the register window can save into the stack, and when it can save, a control signal for controlling it is outputted.

"Call Trap Judge Status (a second status: status bits=001)"

When a procedure call has occurred, judgment is made on whether or not a trap is to be generated.

"Return Trap Judge Status (a third status: status bits =010)"

When a procedure return has occurred, judgment is made on whether or not a trap is to be generated.

"Call Trap Status (a fourth status: status bits=011)"

Call trap is under trap processing.

"Return Trap Status (a fifth status: status bits= 100)"

Return is under trap processing.

The control logic circuit 3 generates a status transition signal, a counter control signal and various kinds of other signals.

Figure 5A:
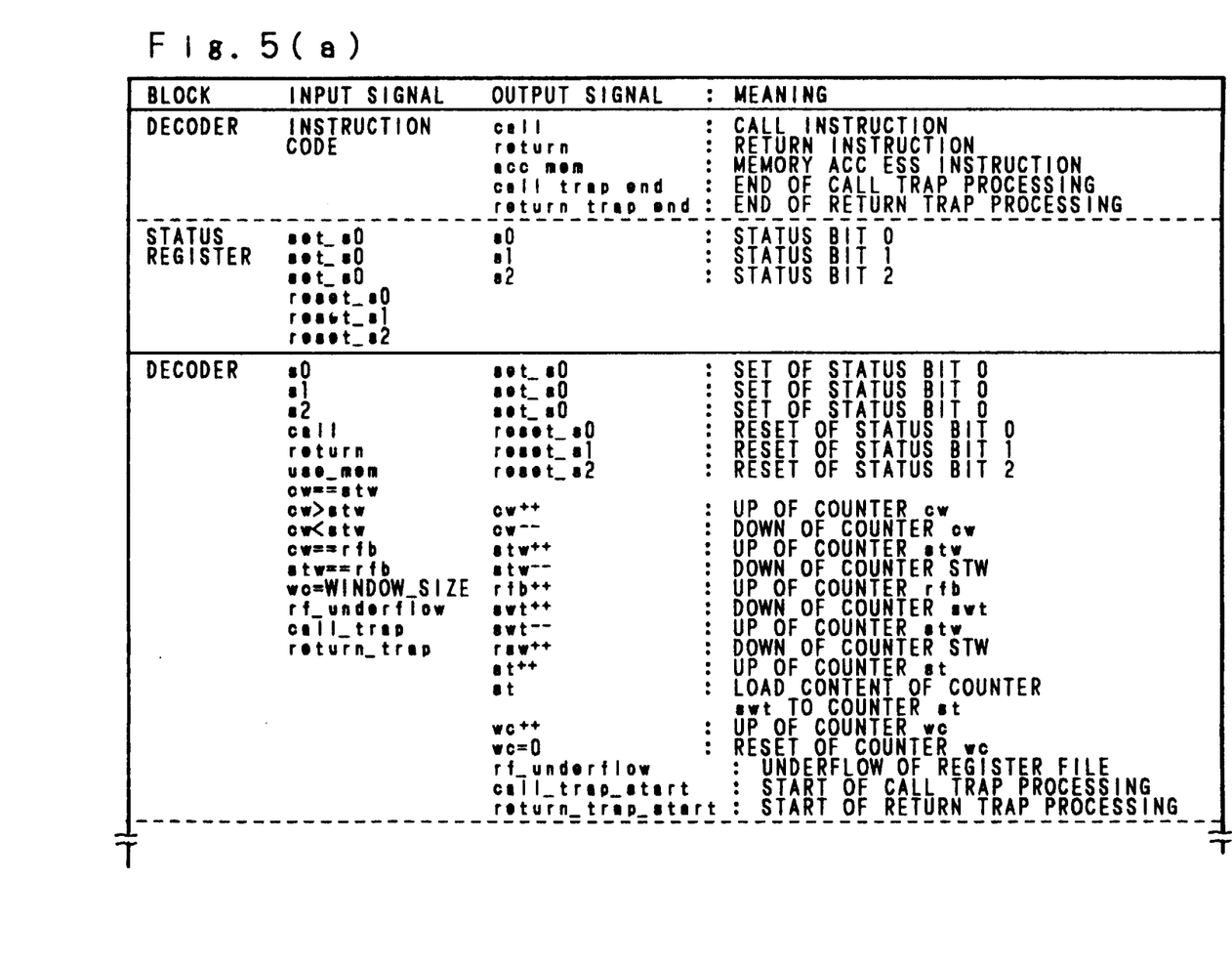
Figure 5B:
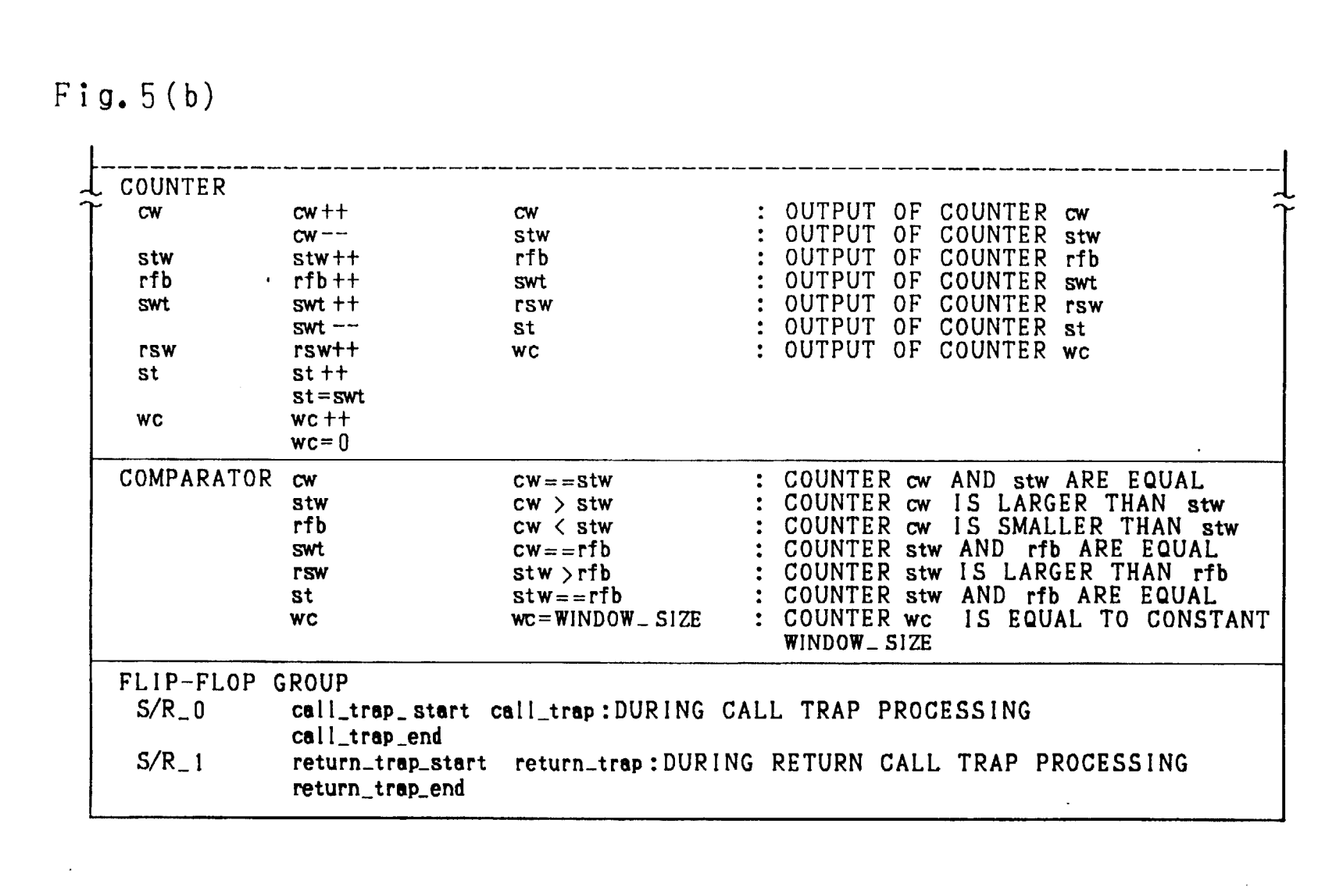

FIGS. 5 (a) and (b) are tables showing a list of input-/output signals to/from each block. Output signals of the control logic circuit on this table in FIGS. 5 (a) and (b) are shown as a first to a 22nd control signals in the order of the top to the bottom.

Figure 6:
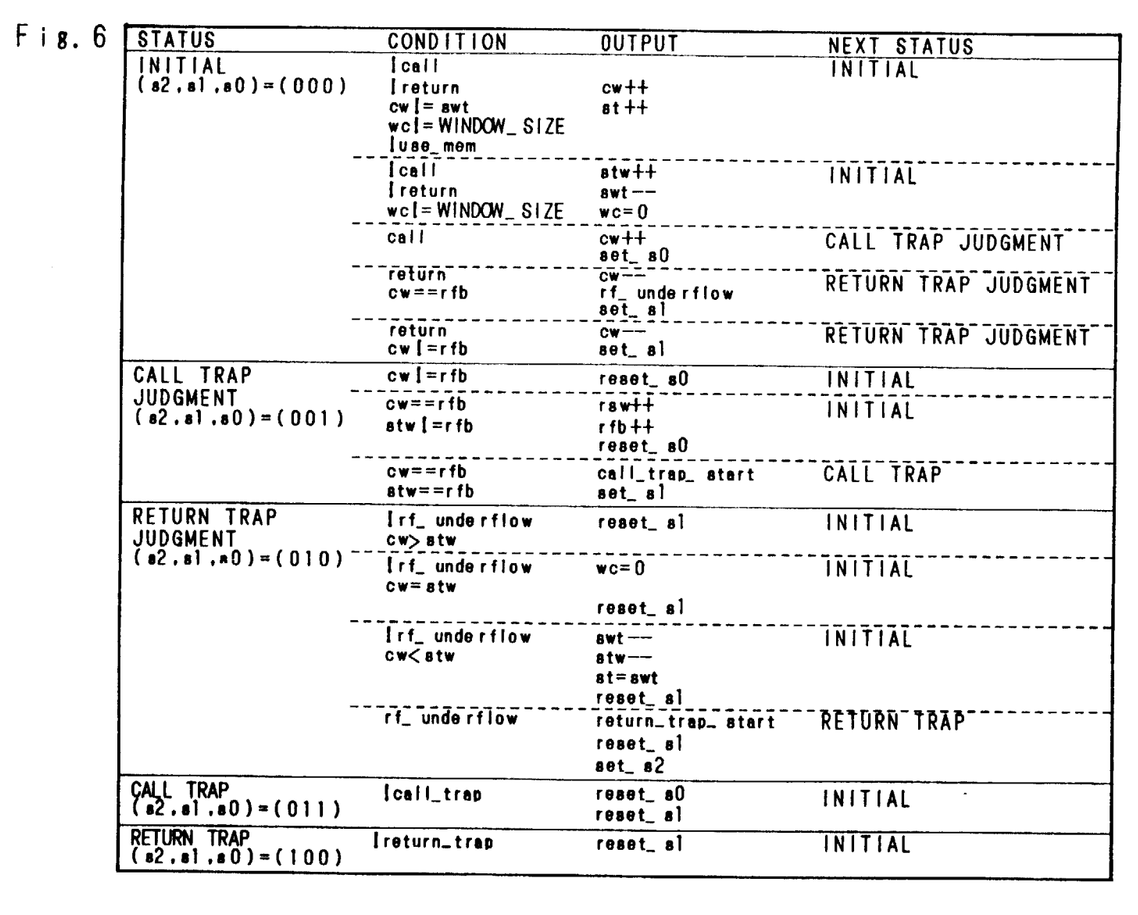
FIG. 6 is a table showing transitions of the statuses of control of a control logic circuit.
Figure 7A:
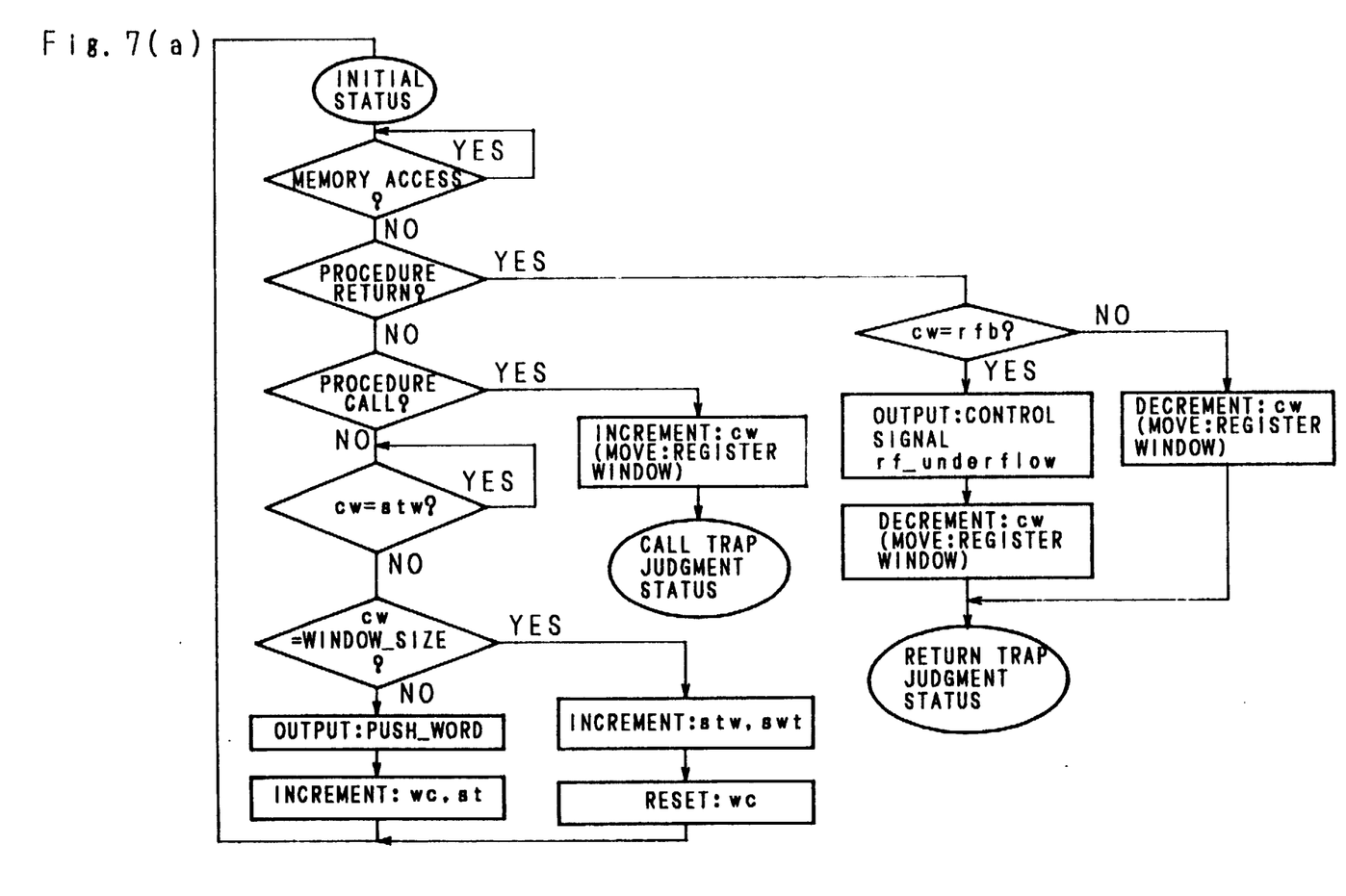
FIGS. 7(a), 7(b) and 7(c) are a flow chart thereof.

Operation of the control logic circuit 3 is the core of the present invention, and description is made thereon in reference to a status transition table with C-language description as shown in FIG. 6 and flow charts in FIGS. 7(a), (b) and (c).

"Initial Status (a first status: FIG. 7(a) )", (1) The initial status is set when hardware is reset. In this status, when an instruction is not any of procedure call, procedure return, or memory access, the following controls are performed.

① The status wherein the counter cw is not equal to the counter stw, and the counter wc is not equal to the window size (WINDOW_SIZE), that is, the status wherein the register window having not completed saving into the stack is being left in the register file.

In that status, a control signal push_word (a seventh signal) is generated which stack-pushes a word of the register file to be calculated with the counter stw set as base address and the counter wc as offset address.

The counters wc and st are incremented in preparation for the next stack push (an 18th signal wc+ + and a 16th signal st+ + are made significant).

In the next status, judgment of possibility of storing the register window being necessary, the initial status is maintained.

② When the counter wc is equal to the window size, since the register window pointed with the counter stw has completed store, the counters stw and swt are incremented (a tenth signal stw+ + and a 13th signal swt+ + are made significant), and the counter wc is reset (a 19th signal wc=0 is made significant).

In the next status, since judgment of possibility of storing the register window is necessary, the initial status is maintained.

(2) The case where an instruction is procedure call.
① The register window is moved by incrementing the counter cw (an eighth signal cw+ + is made significant), and in order to judge whether or not a trap is to be generated, the status is transferred to the call trap judge status (a first signal set_s0 is made significant).

(3) The case where an instruction is procedure return.
① If the counters cw and rfb are equal, it indicates that the register file underflows, and then a control signal rf_underflow (a 20th signal) is generated.

Also, the register window is moved by decrementing the counter cw (a ninth signal cw— is made significant).

Next, the status is transferred to the return trap judge status in order to generate a trap (a second signal set_s2 is made significant).

② When the counters cw and rfb are not equal, the register window is moved by merely decrementing the counter cw (the ninth signal cw— is made significant).

Next, the status is transferred to the return trap judge status in order to amend the pointer to the stack (the second signal set_s1 is made significant).

Figure 7B:
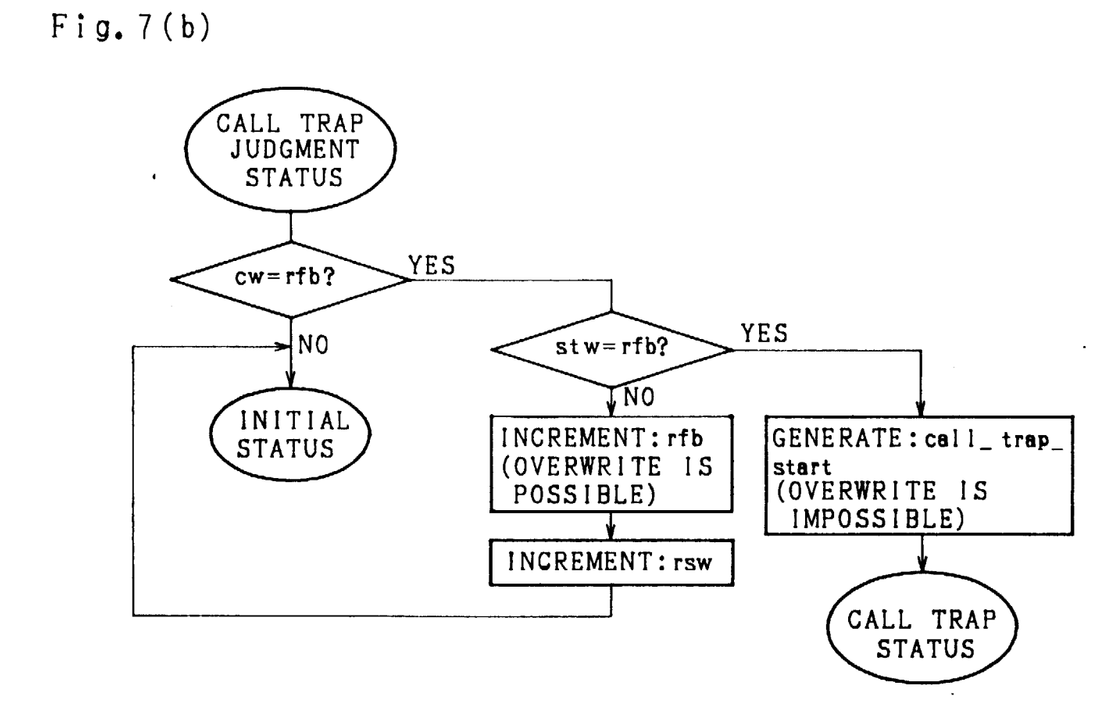

"Call Trap Judge Status (the second status: FIG. 7(b))"

(1) The case where the counters cw and rfb are not equal.
① Since the register file is not in the overflow status, control of merely transferring the status to the initial status is performed (a fourth signal reset_s0 is made significant).

(2) The case where the counters cw and rfb are equal.
① When the counters stw and rfb are not equal, since the register file pointed with the counter cw has already completed saving into the stack, overwriting to its address is possible. Accordingly, the bottom of the register file is raised by incrementing the counter rfb (a 12th signal rfb+ + is made significant), and the register window in the stack, which is restored when an underflow occurs in the register file, is raised by one step by incrementing the counter rsw (a 15th signal rsw+ + is made significant).

Next, the status is transferred to the initial status (the fourth signal reset_s0 is made significant).

② When the counters stw and rfb are equal, the register file pointed by the counter cw has not completed saving into the stack yet, and overwriting is inhibited. Accordingly, there is a need to start saving processing of the register window by generating a trap. To meet the need, a control signal call_trap_start (a 21st signal) is generated.

Next, the status is transferred to the call trap status (the second signal set_s1 is made significant).

Figure 7C:
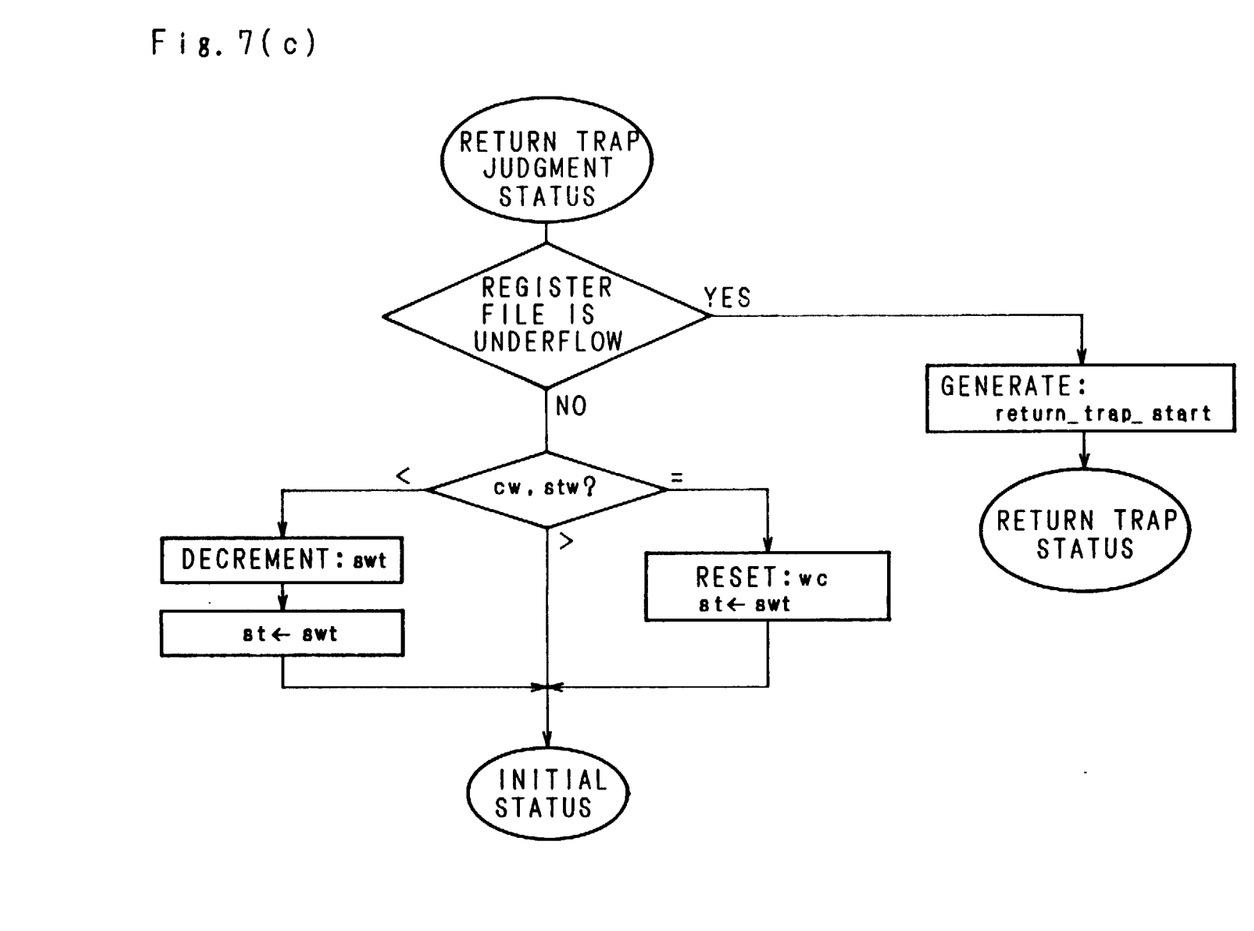

"Return Trap Judge Status (the third status: FIG. 7(c))"

(1) The case where the register file is not in the underflow state.
① When the counter cw is larger than the counter stw, the register window pointed with the counter cw is not yet being stored in the register file (or stored in the stack), which makes overwriting possible. Accordingly, only such processing as that the next status is transferred to the initial status is performed (a fifth signal reset_s1 is made significant).

② When the counters cw and stw are equal, the register window pointed with the counter cw is not yet being stored in the register file, or is under storing processing. When it is under storing processing, the storing processing is required to be stopped. Accordingly, the counter wc is reset (the 19th signal wc=0 is made significant), and st is returned to swt (a 17th signal st=swt is made significant).

Next, the status is transferred to the initial status (the fifth signal reset_s1 is made significant).

③ When the counter cw is smaller than the counter stw, since the register window pointed with the counter cw has been already stored in the register file, that is required to be canceled. Accordingly, the counter swt is decremented (a 14th signal swt— is made significant), and the signal st is set to swt (the 17th signal st=swt is made significant).

Next, the status is transferred to the initial status (the fifth signal reset_s1 is made significant).

(2) The case where the register file is in the underflow state.
① It is necessary to start a restore routine of the register window in the stack by generating a trap. Accordingly, a control signal return_trap_start (a 22nd signal) is generated.

Next, the status is transferred to the return trap status (the fifth signal reset_s1 and a third signal set_s2 are made significant).

"Call Trap Status (the fourth status)"
① In this call trap status, saving processing of the register window into the stack through the control logic circuit 3 is inhibited, and a trap routine is executed. At the point when the trap routine is completed, the status is transferred to the initial status (the fourth signal reset_s0 and the fifth signal reset_s1 are made significant).

"Return Trap Status (the fifth status)"

In this call trap status, saving processing of the register window into the stack through the control logic circuit 3 is inhibited, and the trap routine is executed. At the point when the trap routine is completed, the status is transferred to the initial status (a sixth signal reset_s2 is made significant).

Output signals of the control logic circuit 3 can be expressed with input signals based on a status transition table as shown in FIG. 6. The results thereof by way of example is shown as a table in FIG. 8.

Figure 8:
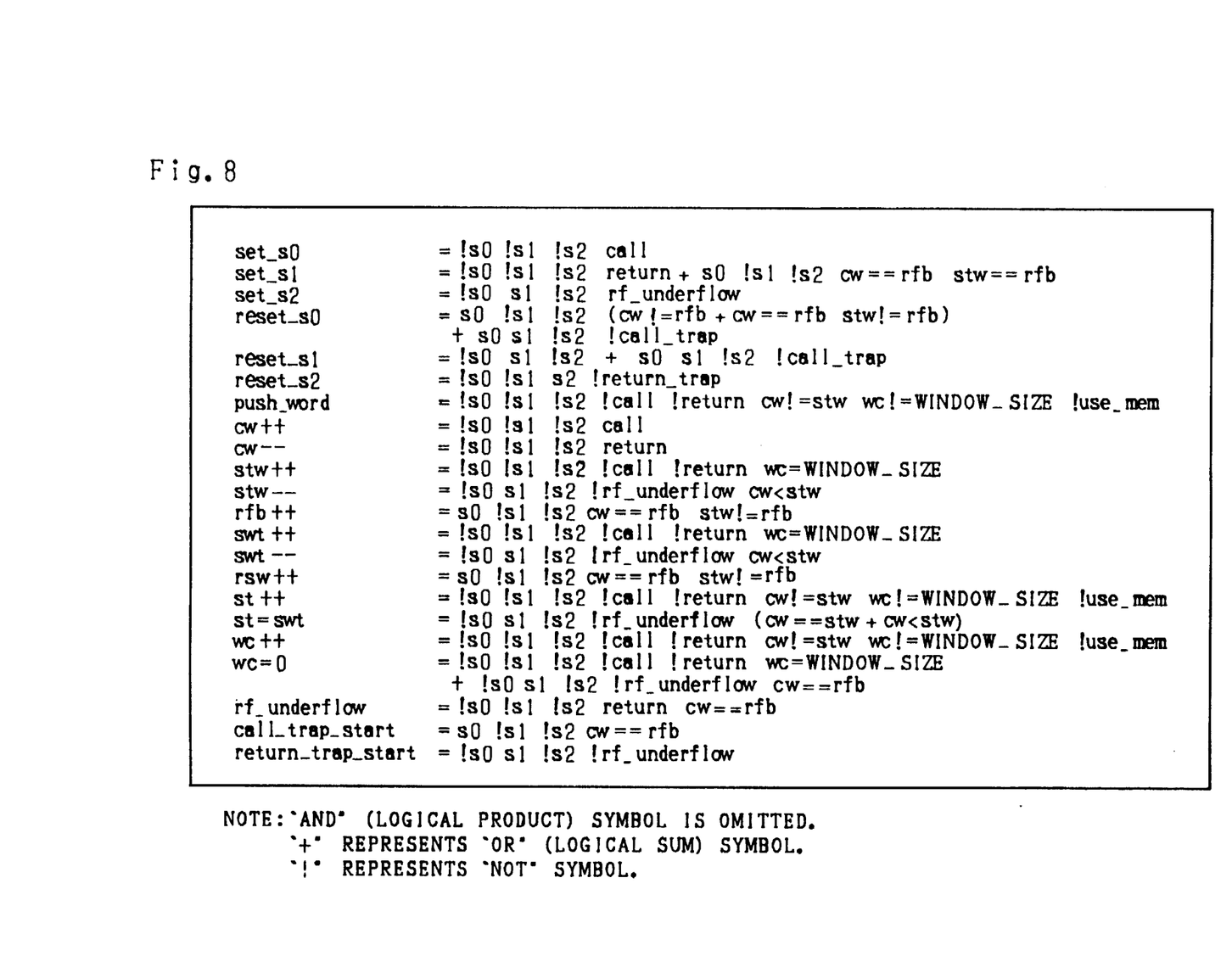
FIG. 8 is a table showing an input/output relation of the control logic circuit for realizing the status transition.

As first method of realizing the logic shown in this table of FIG. 8, there is through a method using a PLA (Programmable Logic Array), and a wired logic, as second method. Irrelevant to whether either of the methods being applicable to the computer of the present invention, a basic mechanical design of the logic circuit can be realized with such a table as shown in FIG. 8.

As detailed above, the reduced instruction computer of the present invention is constituted in a manner that in response to an instruction scheduled to be executed, if possible, before an overflow of the register file takes place, the register windows used by the procedure called in the past are made to save in advance into the stack in the memory. Accordingly, when the register file overflows, there is a high possibility that the register window has already been saved into the memory. As a result, even when the register file overflows, there is a great probability that saving processing of the register window is not to be performed, and thereby a high-speed processing can be realized.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A method for storing data in a register stack for use by a computer, wherein the register stack comprises n windows, each window comprising a fixed number of registers, comprising the steps of:

initializing a current window pointer to point to an initial window of the register stack, said first pointer indicating a window readable and writable by the computer;

initializing a stored window pointer to point to said initial window, said stored window pointer and said current window pointer defining the limits of an active window range;

initializing a stack end pointer to point to said initial window, said stack end pointer and said stored window pointer defining the limits of a stored window range;

decoding an instruction to determine a next action of the computer;

incrementing said current window pointer modulo n when said next action is a procedure call;

decrementing said current window pointer modulo n when said next action is a procedure return;

incrementing said stack end pointer modulo n when said current window pointer is equal to said stack end pointer;

copying at least one register within said active window range to a main memory stack when said next action is an operation other than a procedure call, procedure return, or a memory access and said active window range contains more windows than a first predetermined threshold;

interrupting operation of the computer when said current window pointer is equal to said stack end pointer and equal to said stored window pointer, and said next operation is a procedure call, said step of interrupting continuing until contents of at least one register in said active window range are copied to said main memory stack;

incrementing said stored window pointer modulo n for each window copied to said main memory stack, thereby decreasing said active window range and increasing said stored window range;

copying at least one register from said main memory stack to said stored window range when said next action is an operation other than a procedure call, procedure return, or a memory access, said stored window range contains fewer windows than a second predetermined threshold, and said current window pointer would not be equal to said stack end pointer if incremented modulo n;

interrupting operation of the computer when said current window pointer is equal to said stack end pointer, and said next operation is a procedure return, said step of interrupting continuing until contents of at least one register in said main memory stack are copied to said active window range; and decrementing said stack end pointer modulo n for each window copied from said main memory stack, thereby decreasing said stored window range and increasing said active window range.

* * * * *